(12) United States Patent
Shamasundar et al.

(10) Patent No.: US 10,529,242 B2
(45) Date of Patent: Jan. 7, 2020

(54) METHODS AND SYSTEMS FOR AUTOMATIC DETECTION, ASSISTANCE, AND COMPLETION OF PILOT REPORTS (PIREPS) ONBOARD AN AIRCRAFT

(71) Applicant: HONEYWELL INTERNATIONAL INC., Morris Plains, NJ (US)

(72) Inventors: Raghu Shamasundar, Karnataka (IN); Mahesh Sivaratri, Karnataka (IN); Soumitri Swain, Karnataka (IN); Sivakumar Kanagarajan, TamilNadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/446,522

(22) Filed: Mar. 1, 2017

(65) Prior Publication Data
US 2018/0253982 A1   Sep. 6, 2018

(51) Int. Cl.
*G08G 5/00* (2006.01)
*B64D 43/00* (2006.01)
*G01C 23/00* (2006.01)

(52) U.S. Cl.
CPC .......... *G08G 5/0091* (2013.01); *B64D 43/00* (2013.01); *G01C 23/00* (2013.01); *G08G 5/003* (2013.01); *G08G 5/0008* (2013.01); *G08G 5/0013* (2013.01); *G08G 5/0021* (2013.01)

(58) Field of Classification Search
CPC .................................................. G08G 5/0091
See application file for complete search history.

(56) References Cited

U.S. PATENT DOCUMENTS

| | | |
|---|---|---|
| 5,265,024 A | 11/1993 | Grabill et al. |
| 6,292,747 B1 | 9/2001 | Amro et al. |
| 6,633,801 B1 | 10/2003 | Durlacher et al. |
| 7,817,078 B2 | 10/2010 | Bunch |
| 8,130,121 B2 | 3/2012 | Smith et al. |
| 2002/0039070 A1 | 4/2002 | Ververs et al. |
| 2002/0039072 A1 | 4/2002 | Gremmert et al. |
| 2006/0129286 A1 | 6/2006 | King |

(Continued)

FOREIGN PATENT DOCUMENTS

| | | |
|---|---|---|
| EP | 2463846 A1 | 6/2012 |
| EP | 2821752 A1 | 1/2015 |

OTHER PUBLICATIONS

Extended EP Search Report for Application No. 18159029.0 dated Jul. 3, 2018.

*Primary Examiner* — Imran K Mustafa
(74) *Attorney, Agent, or Firm* — Lorenz & Kopf, LLP

(57) ABSTRACT

A method for obtaining, analyzing, and using pilot report (PIREP) data onboard an aircraft is provided. The method detects information relevant to one or more PIREPs associated with a current flight path of the aircraft, based on aircraft state data and avionics data obtained from a plurality of avionics systems, by at least one processor onboard the aircraft, wherein the one or more PIREPs includes at least one of instrumental PIREPs and pilot experience PIREPs; automatically completes a set of incomplete PIREPs associated with the current flight path using the information relevant to the one or more PIREPs, by the at least one processor, to generate complete PIREPs; and presents the complete PIREPs via a display device onboard the aircraft.

14 Claims, 10 Drawing Sheets

(56) References Cited

U.S. PATENT DOCUMENTS

2013/0027226 A1    1/2013   Cabos
2013/0226452 A1*   8/2013   Watts ................. G01C 21/3407
                                                       701/528
2015/0007080 A1*   1/2015   Nama .................... G06F 3/0484
                                                       715/771

* cited by examiner

METHODS AND SYSTEMS FOR AUTOMATIC DETECTION, ASSISTANCE, AND COMPLETION OF PILOT REPORTS (PIREPS) ONBOARD AN AIRCRAFT

TECHNICAL FIELD

Embodiments of the subject matter described herein relate generally to completion of pilot reports (PIREPs) associated with real-time incidents and flight crew experiences onboard an aircraft. More particularly, embodiments of the subject matter relate to the automatic detection, analysis, and completion of PIREPs relevant to a particular flight plan, onboard an aircraft.

BACKGROUND

A weather report made from the flight deck of an aircraft in flight is a timely and accurate way to provide weather data, including actual icing and turbulence conditions for a particular flight. One such weather report is a pilot report (PIREP), which is a report of actual weather conditions encountered by an aircraft during flight. PIREPs from a particular flight are generally provided to the nearest ground station, via radio and/or electronic submission, and then relayed to other weather offices and air traffic service units. Flight crew members record weather condition observations, using PIREPs, which are then used to assist other flight crews with flight planning and preparation.

Flight crew members are advised to update one or more PIREPs each time there is a condition change affecting safe flight. Conditions may change often, resulting in an increased workload for the flight crew. Accordingly, it is desirable to provide automatic PIREP information without substantially increasing flight crew member workload. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for obtaining, analyzing, and using pilot report (PIREP) data onboard an aircraft. The method detects information relevant to one or more PIREPs associated with a current flight path of the aircraft, based on aircraft state data and avionics data obtained from a plurality of avionics systems, by at least one processor onboard the aircraft, wherein the one or more PIREPs includes at least one of instrumental PIREPs and pilot experience PIREPs; automatically completes a set of incomplete PIREPs associated with the current flight path using the information relevant to the one or more PIREPs, by the at least one processor, to generate complete PIREPs; and presents the complete PIREPs via a display device onboard the aircraft.

Some embodiments of the present disclosure provide a system for obtaining and using pilot report (PIREP) data. The system includes system memory; a communication device, configured to establish communication connections to one or more avionics devices onboard the aircraft, and to transmit and receive data via the communication connections; a display device, configured to present the one or more PIREPs; and at least one processor communicatively coupled to the system memory, the communication device, and the display device, the at least one processor configured to: detect information relevant to the one or more PIREPs, based on aircraft state data and avionics data obtained via the communication connections; identify a current flight path of the aircraft; automatically complete a set of incomplete PIREPs associated with the current flight path using the aircraft data, to generate complete PIREPs; and present the complete PIREPs via the display device, using a color code mechanism to indicate a criticality level of each of the complete PIREPs.

Some embodiments of the present disclosure provide a non-transitory, computer-readable medium containing instructions thereon, which, when executed by a processor, perform a method. The method identifies, by the processor, a plurality of pilot reports (PIREPs) associated with a current flight plan of an aircraft, the plurality of PIREPs including incomplete PIREPs and pre-completed PIREPs; obtains, by the processor, aircraft data from a plurality of avionics devices, the aircraft data associated with PIREP completion; completes the incomplete PIREPs, by the processor, using the aircraft data to generate a set of complete PIREPs; and presents the complete PIREPs and the pre-completed PIREPs, via a display device communicatively coupled to the processor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for obtaining and using pilot report (PIREP) data onboard an aircraft. More specifically, the subject matter relates to the automatic detection of applicable PIREPs, based on a location of the aircraft, one or more user-selected waypoints, geographic locations, and/or a geographic range associated with PIREP data. PIREPs are associated with a geographic area, and are used as a way for flight crew members to report weather conditions, flight crew experiences, incidents, and other flight conditions, such that the PIREP data may be transmitted to a centralized storage system and redistributed to other aircraft flying in the geographic area associated with the PIREP data (based on a subscription and/or general broadcast). In this way, a second aircraft receiving PIREP data collected and submitted by a first aircraft can use the PIREP data to make flight operations decisions and flight planning decisions in an informed way.

Certain terminologies are used with regard to the various embodiments of the present disclosure. A pilot report (PIREP) is a report of actual conditions encountered by an aircraft in flight (e.g., weather conditions, Global Positioning System (GPS) outage, or the like). Generally, PIREPs are manually completed by flight crews during flight. A PIREP may include data fields requiring user input associated with the actual conditions. Such data fields may include, without limitation: a message type, an aircraft location, a time, an altitude or flight level, an aircraft type, a sky condition, flight visibility and weather, an air temperature, a wind speed value, an indication of turbulence, an indication of icing conditions, and flight crew member remarks.

Figure 1:
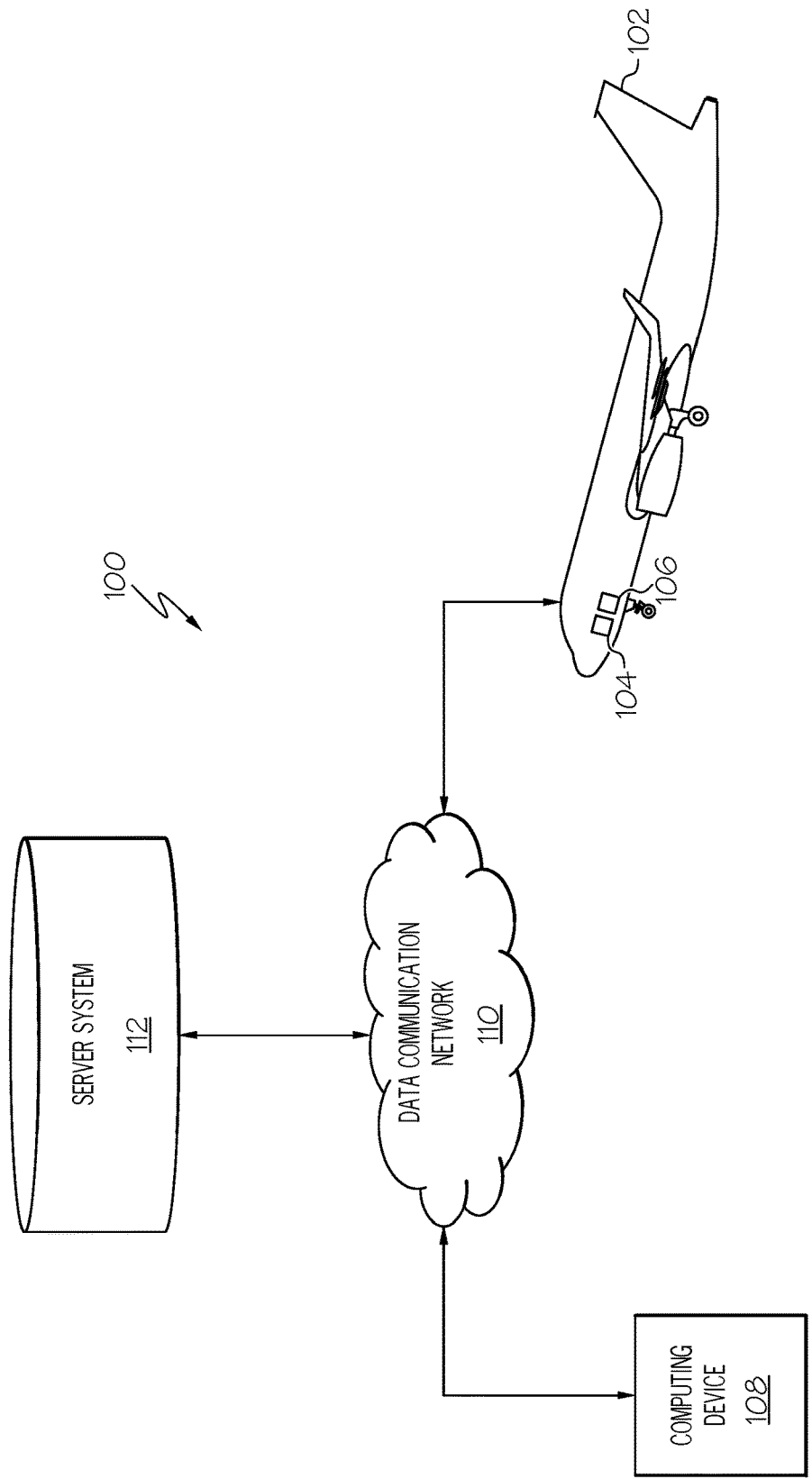
FIG. 1 is a diagram of a pilot report (PIREP) completion system, in accordance with the disclosed embodiments.

Turning now to the figures, FIG. 1 is a diagram of a pilot report (PIREP) completion system 100, in accordance with the disclosed embodiments. The PIREP completion system 100 operates to automatically (i) detect PIREPs that are applicable to a particular geographic area, (ii) obtain aircraft sensor data and aircraft avionics data associated with each applicable PIREP, (iii) analyze the sensor data and aircraft avionics data to identify PIREP data applicable to the current situation, and (iv) complete each of the applicable PIREPs, using the obtained data. The PIREP completion system 100 may include, without limitation, a computing device 108 that communicates with one or more avionics systems 104 and aircraft sensors 106 onboard the aircraft 102, and at least one server system 112, via a data communication network 110. In practice, certain embodiments of the PIREP completion system 100 may include additional or alternative elements and components, as desired for the particular application.

The computing device 108 may be implemented by any computing device that includes at least one processor, some form of memory hardware, a user interface, and communication hardware. For example, the computing device 108 may be implemented using a personal computing device, such as a tablet computer, a laptop computer, a personal digital assistant (PDA), a smartphone, or the like. In this scenario, the computing device 108 is capable of storing, maintaining, and executing an Electronic Flight Bag (EFB) application configured to detect and analyze applicable PIREPs, obtain completion data associated with the applicable PIREPs, and automatically complete the applicable PIREPs during flight. In other embodiments, the computing device 108 may be implemented using a computer system onboard the aircraft 102, which is configured to determine and present fuel tankering recommendations.

The aircraft 102 may be any aviation vehicle for which pilot reports (PIREPs) are relevant and applicable during completion of a flight path. The aircraft 102 may be implemented as an airplane, helicopter, spacecraft, hovercraft, or the like. The one or more avionics systems 104 may include a Flight Management System (FMS), an aircraft onboard radar system, one or more line replaceable units (LRUs) onboard the aircraft, or the like. Data obtained from the one or more avionics systems 104 may include, without limitation: flight plan data, radar data, a location of the aircraft, a current time, a current altitude level, and an aircraft type, or the like.

The server system 112 may include any number of application servers, and each server may be implemented using any suitable computer. In some embodiments, the server system 112 includes one or more dedicated computers. In some embodiments, the server system 112 includes one or more computers carrying out other functionality in addition to server operations. The server system 112 generally functions to receive, store, and provide any type of PIREP data, including, but not limited to: pre-completed PIREPs, partially-complete PIREPs, incomplete PIREPs; weather data; aircraft avionics and sensor data; or the like.

The computing device 108 is usually located onboard the aircraft 102, and the computing device 108 communicates with the one or more avionics systems 104 and aircraft sensors 106 via wired and/or wireless communication connection. The computing device 108 and the server system 112 are generally disparately located, and the computing device 108 communicates with the server system 112 via the data communication network 110 and/or via communication mechanisms onboard the aircraft 102.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The computing device 108 operates during flight of the aircraft 102 to automatically detect PIREPs associated with a current location of the aircraft 102, and to automatically complete the detected PIREPs. During typical operation, the computing device 108 communicates with one or more avionics systems 104 and aircraft sensors 106 to obtain weather data, aircraft data, location data, and other data associated with a current position and conditions of the aircraft 102. The computing device 108 analyzes the obtained data to determine applicable data used to complete the relevant PIREPs, present the completed PIREPs via a display device onboard the aircraft, and to transmit the completed PIREPs to the server system 112 for storage and future use (e.g., potential distribution to other aircraft and/or air traffic control). The server system 112 then provides the completed PIREPs to other aircraft traveling in geographic areas applicable to the completed PIREPs, thereby providing relevant weather and flight condition data to the other aircraft that have not traveled in the applicable geographic areas recently and are unaware of such conditions.

Figure 2:
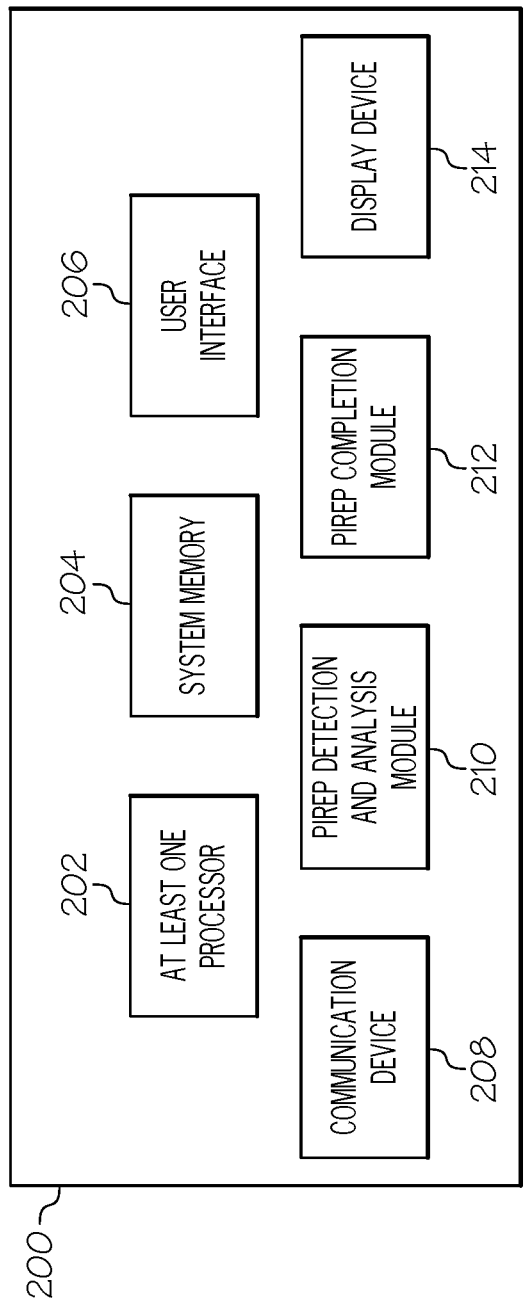
FIG. 2 is a functional block diagram of a computing device, in accordance with the disclosed embodiments.

FIG. 2 is a functional block diagram of a computing device 200 for use as part of a pilot report (PIREP) completion system (see reference 100, FIG. 1), in accordance with the disclosed embodiments. It should be noted that the computing device 200 can be implemented with the computing device 108 depicted in FIG. 1. In this regard, the computing device 200 shows certain elements and components of the computing device 108 in more detail. In practice, an embodiment of the computing device 200 may include additional or alternative elements and components, as desired for the particular application. For example, additional components such as displays and user input components may be employed without departing from the scope of the present disclosure.

The computing device 200 generally includes, without limitation: at least one processor 202; system memory 204; a user interface 206; a communication device 208; a pilot report (PIREP) detection and analysis module 210; a pilot report (PIREP) completion module 212; and a display device 214. These elements and features of computing device 200 may be operatively associated with one another, coupled to one another, or otherwise configured to cooperate with one another as needed to support the desired functionality—in particular, automatically detecting and completing PIREPs that are applicable to a particular flight plan or subset of a flight plan, during flight, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the automatic PIREP detection and completion techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with pilot reports (PIREPs), and graphical elements associated with the automatic PIREP completion system. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide user input PIREP data for a current PIREP and/or user requests for previously obtained PIREPs, as described herein.

In certain embodiments, the user interface 206 may include or cooperate with various features to allow a user to interact with the computing device 200 via graphical elements rendered on a display element (e.g., the display device 214). Accordingly, the user interface 206 may initiate the creation, maintenance, and presentation of a graphical user interface (GUI). In certain embodiments, the display device 214 implements touch-sensitive technology for purposes of interacting with the GUI. Thus, a user can manipulate the GUI by moving a cursor symbol rendered on the display device 214, or by physically interacting with the display device 214 itself for recognition and interpretation, via the user interface 206.

The communication device 208 is suitably configured to communicate data between the computing device 200 and one or more remote servers, and between the computing device 200 and one or more aircraft sensors and avionics systems onboard an aircraft. The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: flight plan data, radar data, aircraft sensor data, a location of the aircraft, a current time, a current altitude level, and an aircraft type. Data provided by the communication device 208 may include, without limitation, pre-completed PIREPs and other PIREP data.

The pilot report (PIREP) detection and analysis module 210 is configured to detect PIREPs associated with a particular geographic location, applicable to a current flight of the aircraft on which the computing device 200 is located. A pilot report (PIREP) is a report of actual conditions encountered by an aircraft in flight (e.g., weather conditions, an altitude drop condition, a GPS outage condition, or the like), and which is automatically detected (by the PIREP detection and analysis module 210) and completed by the PIREP completion module 212. The particular geographic location may be a waypoint or other subset of a flight plan, or a geographic range (e.g., a radius from a particular geographic point or waypoint). In some embodiments, the geographic location may be detected by a navigation system or other avionics onboard the aircraft. In some embodiments, the geographic location may be provided by user input, via the user interface 206.

The pilot report (PIREP) completion module 212 is configured to use aircraft sensor data and aircraft avionics data, obtained via the communication device 208, to complete the applicable PIREPs detected by the PIREP detection and analysis module 210. The PIREP completion module 212 may automatically complete applicable PIREPs for a particular geographic location (e.g., a waypoint of a flight path, a geographic range) and/or when a particular condition (e.g., weather conditions, an altitude drop condition, a GPS outage condition, or the like) is encountered. For any of these conditions, a comparison is made to the "normal" conditions for the aircraft, and when the current condition deviates from the "normal" condition or normal range of conditions, then the deviation is reported as part of the completed PIREP. The PIREP completion module 212 uses the obtained aircraft avionics data and aircraft sensor data to complete data fields of each PIREP, which may include, without limitation: a message type, an aircraft location, a time, an altitude or flight level, an aircraft type, a sky condition, flight visibility and weather, an air temperature, a wind speed value, an indication of turbulence, an indication of icing conditions, and flight crew member remarks.

In practice, the PIREP detection and analysis module 210 and/or the PIREP completion module 212 may be implemented with (or cooperate with) the at least one processor 202 to perform at least some of the functions and operations described in more detail herein. In this regard, the PIREP detection and analysis module 210 and/or the PIREP completion module 212 may be realized as suitably written processing logic, application program code, or the like.

The display device 214 is configured to display various icons, text, and/or graphical elements associated with automatic PIREP completion, including an flight plan map, indications of waypoints, graphical representations of a geographic location radius, a graphical user interface (GUI) for user input PIREP data, or the like. In an exemplary embodiment, the display device 214 and the user interface 206 are communicatively coupled to the at least one processor 202. The at least one processor 202, the user interface 206, and the display device 214 are cooperatively configured to display, render, or otherwise convey one or more graphical representations or images associated with automatic PIREP completion on the display device 214, as described in greater detail below. In an exemplary embodiment, the display device 214 is realized as an electronic display configured to graphically display automatic PIREP completion data, as described herein. In some embodiments, the computing device 200 is an integrated computer system onboard an aircraft, and the display device 214 is located within a cockpit of the aircraft, and is thus implemented as an aircraft display. In other embodiments, the display device 214 is implemented as a display screen of a standalone, personal computing device (e.g., laptop computer, tablet computer). It will be appreciated that although the display device 214 may be implemented using a single display, certain embodiments may use additional displays (i.e., a plurality of displays) to accomplish the functionality of the display device 214 described herein.

Figure 3:
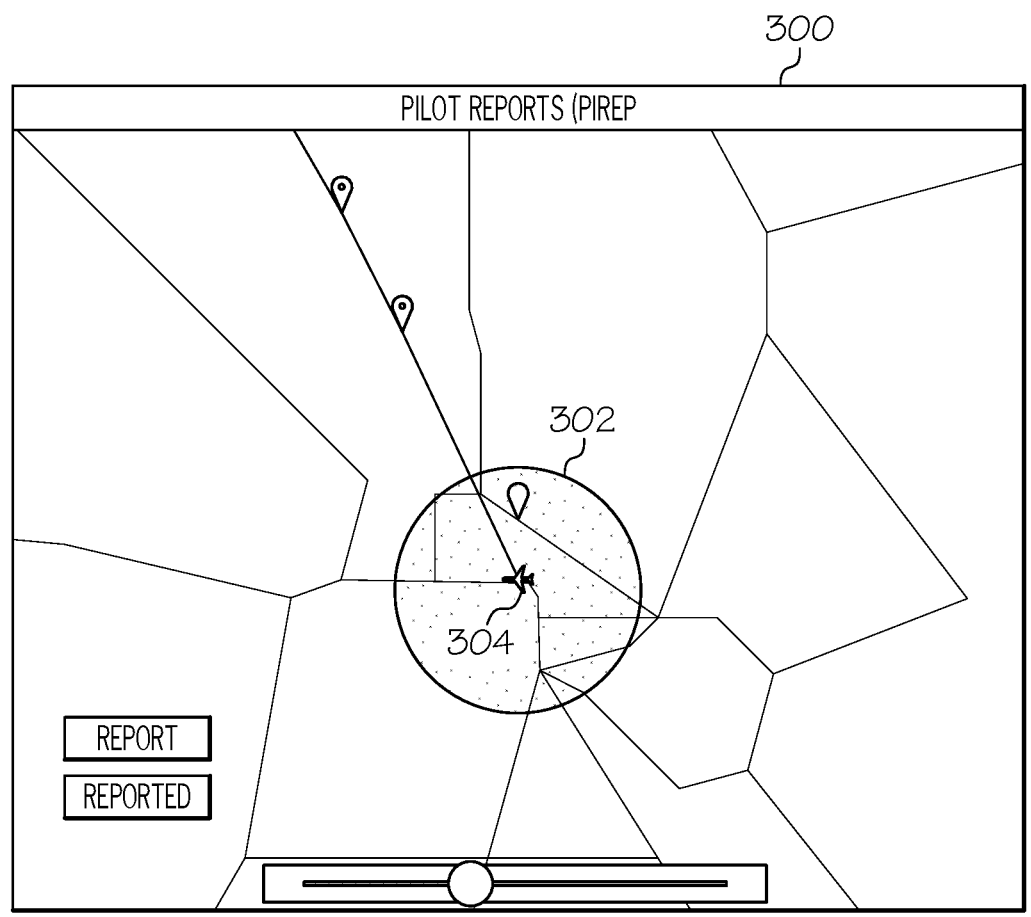
FIG. 3 is a diagram of a PIREP display and user interface, in accordance with the disclosed embodiments.

FIG. 3 is a diagram of a PIREP display 300 and user interface, in accordance with the disclosed embodiments. The PIREP display 300 and user interface is configured to receive user input selections and to present graphical elements associated with automatic completion of PIREPs. Using the PIREP display 300 and user interface, the flight crew can select a range for which surrounding PIREPs will be displayed in conjunction with the active flight plan. In this example, a range of 16 Nautical Miles (NM) has been selected, which is indicated by range graphical element 302. Range graphical element 302 has the selected radius of 16 NM from a position of the aircraft, which is represented by aircraft graphical element 304 positioned in the center of the range graphical element 302. When the flight crew has selected the radius for the range graphical element 302, the PIREP display 300 and user interface transmits a request for PIREP data for the selected radius, and then presents the requested PIREP data, once received.

Figure 4:
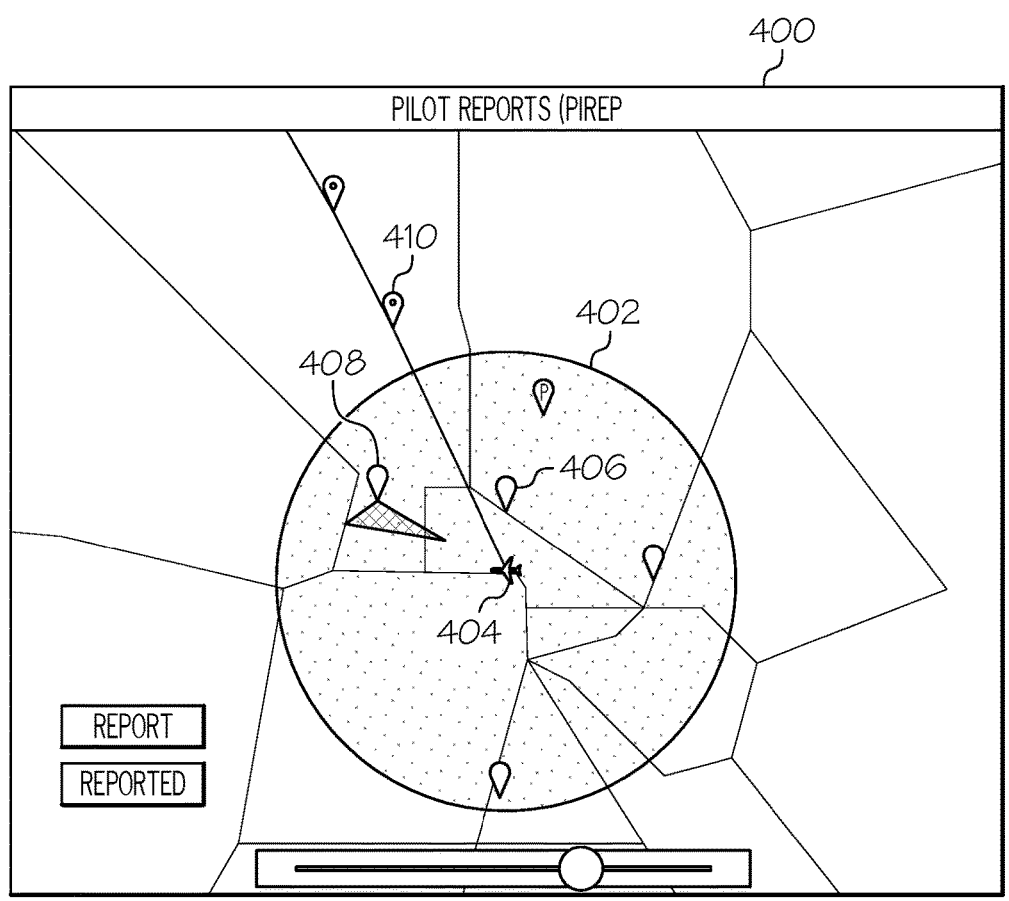
FIG. 4 is a diagram of another embodiment of a PIREP display and user interface, in accordance with the disclosed embodiments.

FIG. 4 is a diagram of another embodiment of a PIREP display 400 and user interface, in accordance with the disclosed embodiments. Like the embodiment shown in FIG. 3, the PIREP display 400 and user interface is configured to receive user input selections and to present graphical elements associated with automatic completion of PIREPs. Also like the embodiment shown in FIG. 3, the PIREP display 400 and user interface may be used by the flight crew to select a range (e.g., represented by range graphical element 402) around the aircraft (e.g., represented by aircraft graphical element 404) for which surrounding PIREPs will be displayed in conjunction with the active flight plan.

As shown, inside the user-selected range graphical element 402, the PIREP display 400 presents various types of graphical elements or "markers", which are each associated with a particular type of PIREP. The first type of PIREP presented is an instrumental PIREP, which is automatically detected by aircraft instruments (e.g., radar). The instrumental PIREP is presented and completed based on the obtained instrumentation data. As one example, a marker for an instrumentation PIREP may indicate a location for which aircraft instrumentation has detected a weather hazard and for which a PIREP may be automatically completed. The second type of PIREP presented is a pilot experience PIREP, which is initiated by the flight crew based on flight characteristics and flight conditions that the flight crew has determined to be informative to other aircraft. Here, the flight crew may select a PIREP associated with that location and provide user-entered PIREP data.

As shown, marker 406 is a "pilot experience marker", which may be selected by the flight crew to provide a pilot PIREP for the location indicated on the map by the marker 406. A pilot PIREP is used by the flight crew to select and provide user-entered PIREP data. Marker 408 is an "instrumental marker" that indicates a minor instrument-detected weather condition at the indicated location. Marker 410 is also an "instrumental marker", but marker 410 indicates a major instrument-detected weather condition at the indicated location. Minor instrument-detected weather conditions and major instrument-detected weather conditions are based on a detected severity of weather distortion. For example, when a heavy thunderstorm is detected, then it is coded as a red marker, indicating a major weather condition. As another example, a minor weather distortion, such as a small or relatively insignificant precipitation or wind condition, wherein little effect would be felt by the aircraft, is coded as a yellow marker.

Additionally, movement of detected weather conditions indicates whether the weather condition is determined to be major or minor. Detected weather conditions that are moving toward the aircraft (i.e., "ownship") are coded as a higher level of criticality than a detected weather condition that is moving away from the aircraft. In the example shown in FIG. 4, higher levels of criticality are coded as red markers, while lower levels of criticality are coded as yellow markers.

Figure 5A:
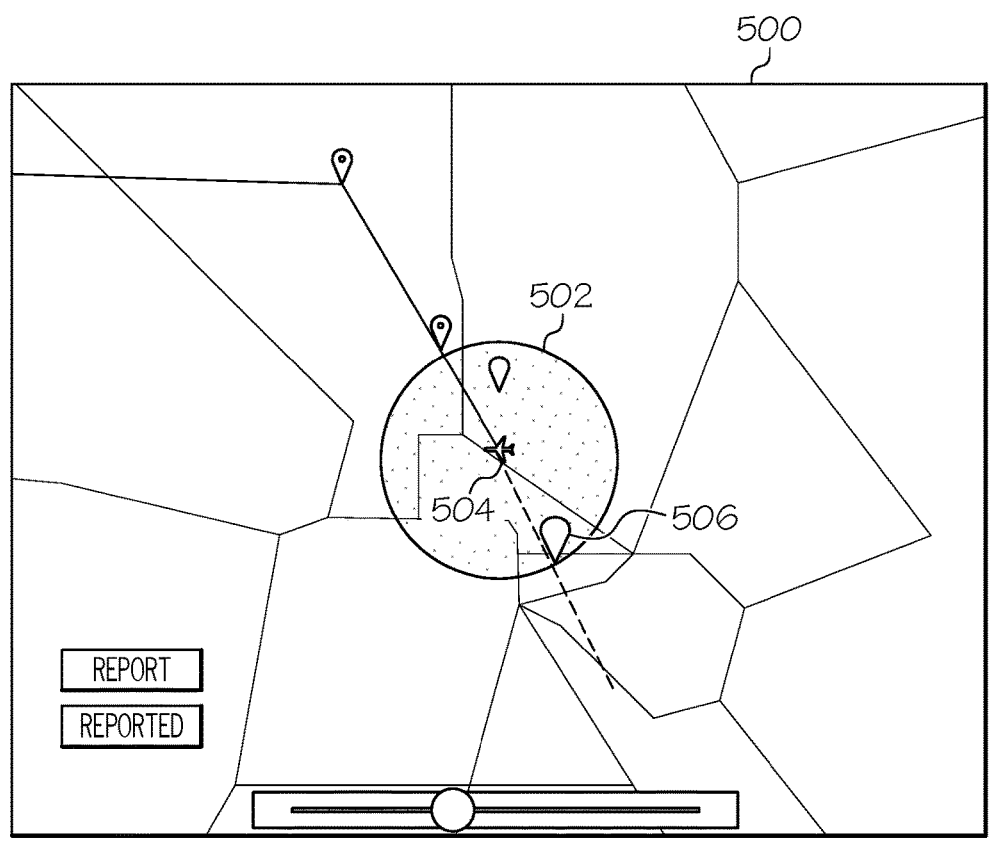
FIGS. 5A-5C are diagrams of additional embodiments of PIREP displays and user interfaces, in accordance with the disclosed embodiments.
Figure 5B:
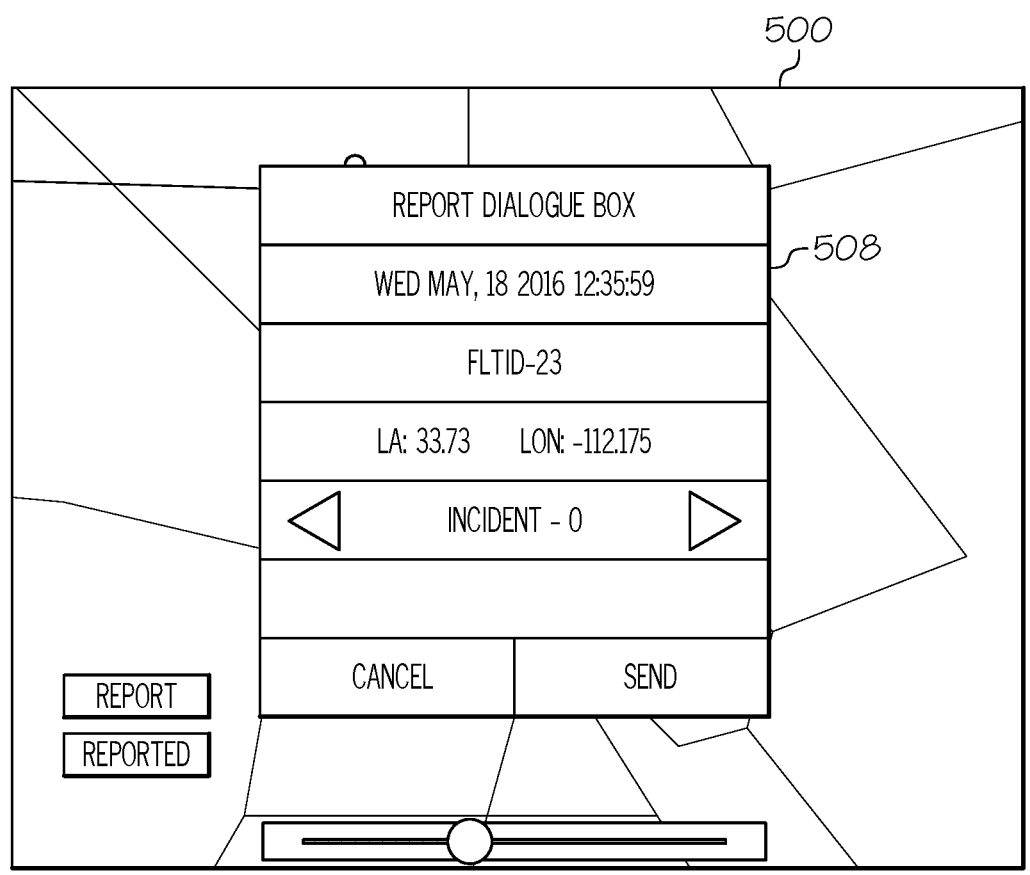
Figure 5C:
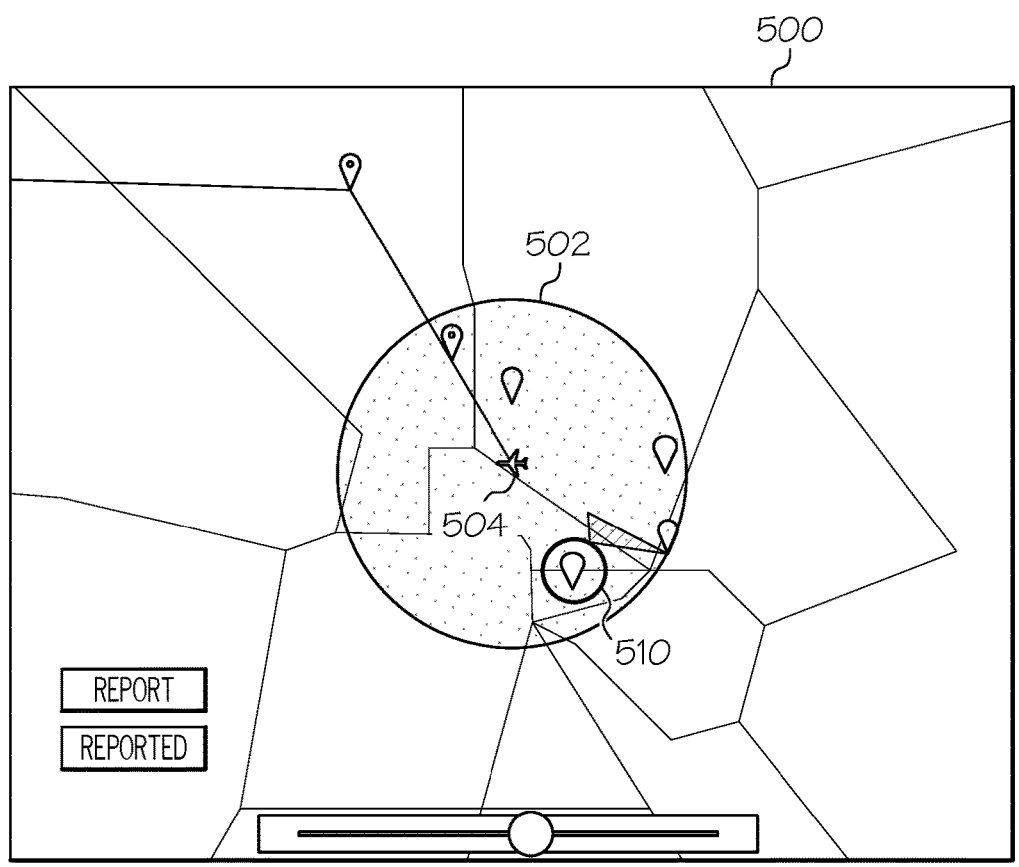

FIGS. 5A-5C illustrate a sequence of diagrams of a PIREP display 500 and user interface, in accordance with the disclosed embodiments. FIG. 5A shows the PIREP display 500 that includes a user-selected range graphical element 502 and an aircraft graphical element 504. The PIREP display 500 presents a user-selectable marker 506 which, when selected, initiates presentation of a PIREP graphical user interface (GUI) 508, as shown in FIG. 5B. Here, the PIREP GUI 508 appears on the PIREP display 500 when the marker 506 is selected, and the PIREP GUI 508 includes automatically completed data fields. A flight crew member may select the marker 506 to initiate presentation of the PIREP GUI 508 with the automatically completed PIREP report data, review the automatically completed PIREP report data, and submit the automatically completed PIREP report data for transmission to a remote server for storage and future use. As shown in FIG. 5C, after the automatically completed PIREP report data has been submitted to the remote server for storage, the PIREP display 500 acknowledges availability of the automatically completed PIREP report data by presenting a new marker 510. The new marker 510 can then be selected by a user, to obtain and display the pre-completed PIREP data for viewing.

Figure 6:
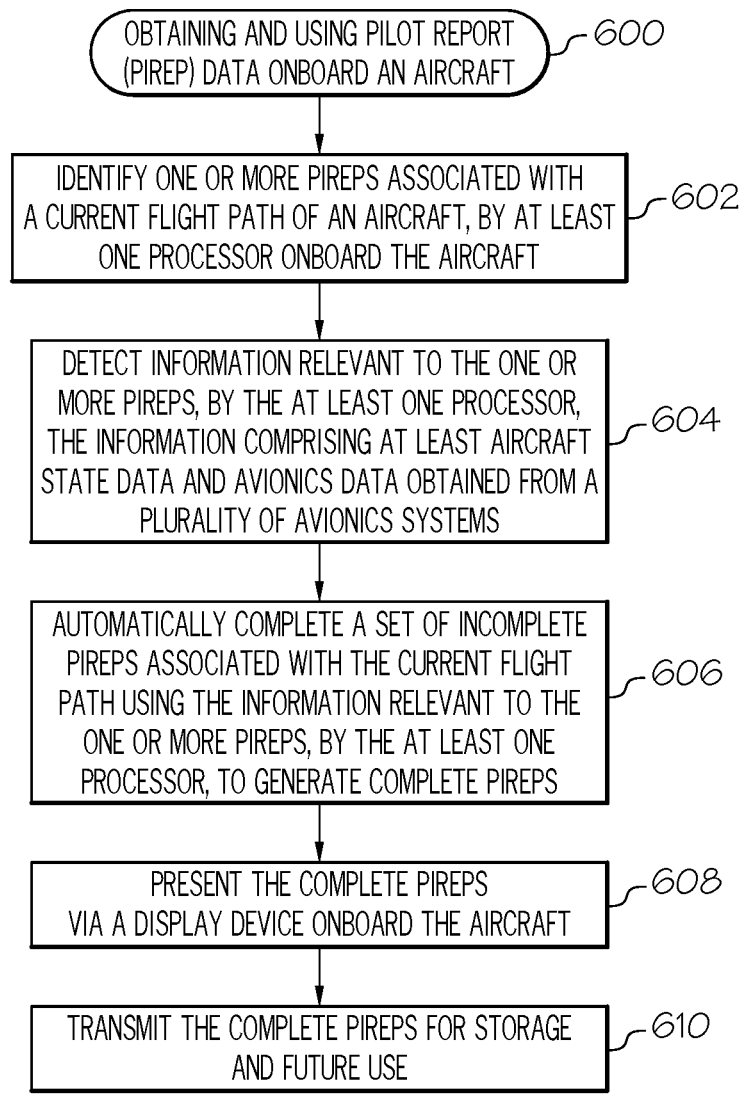
FIG. 6 is a flow chart that illustrates an embodiment of a process for obtaining and using pilot report (PIREP) data onboard an aircraft.

FIG. 6 is a flow chart that illustrates an embodiment of a process 600 for obtaining and using pilot report (PIREP) data onboard an aircraft. First, the process 600 identifies one or more PIREPs associated with a current flight path of an aircraft, by at least one processor onboard the aircraft (step 602). In some embodiments, the process 600 identifies relevant PIREPs associated with waypoints of the current flight path, wherein the relevant PIREPs include pre-completed PIREPs and the incomplete PIREPs. A pilot report (PIREP) is a report of actual weather conditions encountered by an aircraft in flight. PIREPs are associated with a geographic area, and are used as a way for flight crew members to report weather conditions and other flight conditions, such that the PIREP data may be transmitted to a centralized storage system and redistributed to other aircraft flying in the geographic area associated with the PIREP data. In this way, a second aircraft receiving PIREP data collected and submitted by a first aircraft can use the PIREP data to make flight operations decisions and flight planning decisions in an informed way.

A PIREP may include data fields associated with the actual weather conditions, wherein the data fields require completion by a flight crew during flight. Such data fields may include, without limitation: a message type, an aircraft location, a time, an altitude or flight level, an aircraft type, a sky condition, flight visibility and weather, an air temperature, a wind speed value, an indication of turbulence, an indication of icing conditions, and flight crew member remarks. An incomplete PIREP includes defined data fields that have not yet been completed or "filled in" by a flight crew during flight. A pre-completed PIREP has been completed by a second aircraft that has already traveled in the geographic area associated with the PIREP, and has been made available to the first aircraft.

Relevant PIREPs associated with a current flight path of an aircraft, which are identified by the process 600 (step 602), may be (i) indicated by a current geographic location of the aircraft, (ii) selected by user input indications of the relevant PIREPs, or (iii) triggered and identified by an altered environmental condition (e.g., weather conditions, altitude drop conditions, GPS outage conditions, or the like) detected onboard the aircraft.

As referenced in step 602, in some embodiments, the process 600 detects a current geographic location of the aircraft, via a navigation system communicatively coupled to the at least one processor, and automatically detects the relevant PIREPs based on the current geographic location. Here, relevant PIREPs include incomplete PIREPs that have not yet been completed by the aircraft, complete PIREPs that have been automatically completed by the aircraft, and pre-completed PIREPs that have been completed by other aircraft (e.g., a second aircraft) that have previously traveled in the current geographic location. The relevant PIREPs are automatically detected based on the current geographic location, in real-time, and are then automatically completed, presented, and transmitted in real-time.

Also as referenced in step 602, in some embodiments, the process 600 receives, via a user interface communicatively coupled to the at least one processor, user input location selections comprising at least a subset of a geographic area associated with the current flight plan, and automatically completes the set of incomplete PIREPs associated with the user input location selections using the aircraft data, to generate the complete PIREPs. Here again, the relevant PIREPs are determined based on the user input selections, and are then automatically completed, presented, and transmitted in real-time.

Also as referenced in step 602, in addition to automatic detection of relevant PIREPs based on geographic area and detection of relevant PIREPs based on user input selections, relevant PIREPs may be automatically requested, for the current geographic location, when a hazardous or altered environmental condition (e.g., weather conditions, altitude drop conditions, GPS outage conditions, or the like) is detected. Here, the process 600 detects an altered environmental condition, via at least one of an aircraft onboard radar and one or more aircraft onboard sensors, wherein the information relevant to the one or more PIREPs comprises the altered environmental condition. When the altered environmental condition is detected, the process 600 automatically completes one of the incomplete PIREPs, based on the altered environmental condition.

The process 600 detects information relevant to one or more PIREPs associated with a current flight path of an aircraft, by at least one processor onboard the aircraft, the information comprising at least aircraft state data and avionics data obtained from a plurality of avionics systems (step 604). In some embodiments, the process 600 detects the relevant information by obtaining the aircraft state data comprising at least a location of the aircraft and an aircraft type, via a communication device communicatively coupled to at least one processor onboard the aircraft, and obtaining the avionics data comprising at least one of flight plan data, radar data, aircraft sensor data, a current time, and a current altitude level, via the communication device.

Here, the process 600 obtains the required aircraft data from aircraft onboard avionics and/or aircraft onboard sensors, and the process 600 automatically completes a set of incomplete PIREPs associated with the current flight path using the information relevant to the one or more PIREPs, to generate complete PIREPs (step 606).

Once the applicable aircraft data is obtained and used to complete the PIREPs applicable to the geographic area, the process 600 then presents the complete PIREPs via a display device onboard the aircraft (step 608). In some embodiments, the process 600 presents the PIREPs as a graphical user interface with a formatted PIREP data display that includes weather condition and flight condition data associated with a selected PIREP. In some embodiments, the process 600 presents the PIREPs as user-selectable graphical elements (e.g., user-selectable markers) on a map display such that the marker associated with a particular PIREP is presented at the applicable geographic area on the display. Here, the completed PIREPs are made available to the aircraft that originally obtained the PIREP data and created the PIREPs.

In some embodiments, the process 600 presents the complete PIREPs and the pre-completed PIREPs via the display device, according to a color code mechanism to indicate a criticality level of each of the complete PIREPs and the pre-completed PIREPs. Here, the user-selectable markers for each of the complete PIREPs, presented by the process 600, may be color-coded to indicate a severe weather condition, a less-severe weather condition, a mild weather condition, no detectable weather condition, or the like.

In certain embodiments, in addition to presenting the complete PIREPs and the pre-completed PIREPs via the display device (step 608), the process 600 also transmits the complete PIREPs for storage and future use (step 610). Here, the process 600 establishes, via a communication device, a communication connection to at least one remote server, and then transmits, via the communication device, the complete PIREPs and the pre-completed PIREPs to the at least one remote server for storage. In some embodiments, the process 600 transmits the complete PIREPs in real-time, at a time of completion, such that the complete PIREPs are available for redistribution and use by other aircraft, for informational purposes, as soon as the PIREPs are completed and submitted. Transmitting the completed PIREPs in real-time provides the most relevant, updated PIREP data for use by other aircraft flying or planning to fly into the geographic areas associated with the updated PIREP data.

Figure 7:
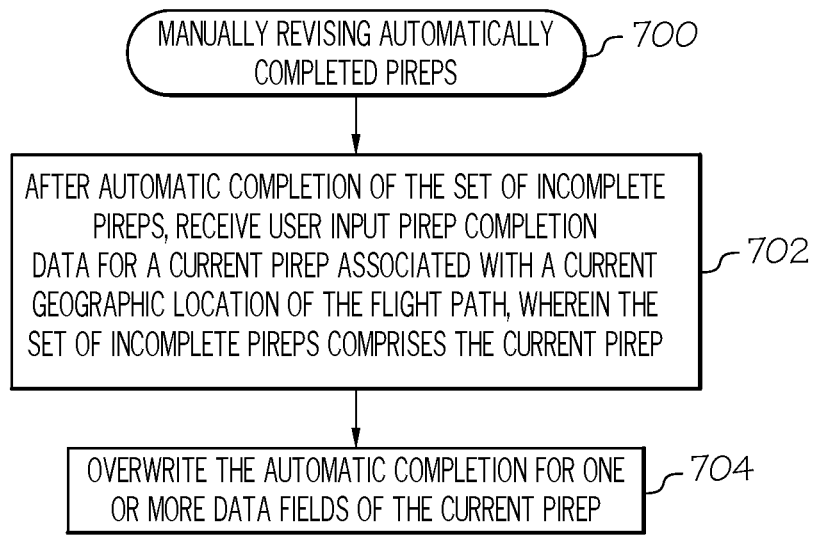
FIG. 7 is a flow chart that illustrates an embodiment of a process for manually revising automatically completed PIREPs.

FIG. 7 is a flow chart that illustrates an embodiment of a process 700 for obtaining user-entered manual revisions of automatically completed pilot reports (PIREPs). After automatic completion of a set of incomplete PIREPs, receive user input PIREP completion data for a current PIREP associated with a current geographic location of the flight path, wherein the set of incomplete PIREPs comprises the current PIREP (step 702). Here, the process 700 has detected one or more relevant PIREPs associated with the current geographic location, which may have been indicated automatically, by a user selection, or triggered by the detection of an altered environmental condition (as described with regard to FIG. 6). The process 700 has automatically completed the one or more relevant PIREPs, and presented the automatically completed one or more relevant PIREPs.

Once an automatically completed PIREP is presented onboard the aircraft, the user may determine that one or more of the automatically completed data fields includes incorrect or incomplete information. In this case, the user may decide to change the one or more of the automatically completed data fields to include more information or different information, and the user then submits user input PIREP completion data. The process 700 then overwrites the automatic completion for one or more data fields of the current PIREP (step 704). In this scenario, the process 700 has presented an automatically completed PIREP for a flight crew member onboard the aircraft to review, and the flight crew member decides to change one or more of the completed data fields of the PIREP. A flight crew member may determine that it is appropriate to change an automatically completed PIREP data field based on inaccuracies in data detection or presentation, or to provide additional comments for the PIREP. Once overwritten, the PIREP may be stored, presented via aircraft onboard display device, transmitted to a remote server for storage and redistribution to other aircraft traveling in the geographic area applicable to the PIREP, or the like.

Figure 8:
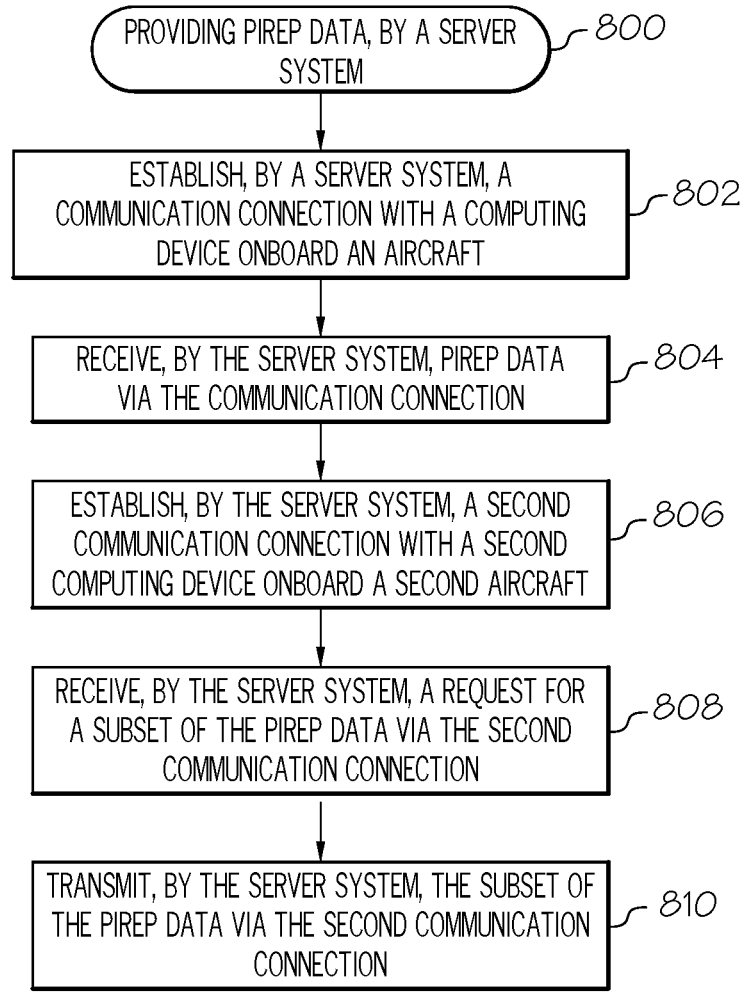
FIG. 8 is a flow chart that illustrates an embodiment of a process for providing PIREP data, by a server system.

FIG. 8 is a flow chart that illustrates an embodiment of a process 800 for providing pilot report (PIREP) data, by a server system. The server system is configured to store and maintain PIREP data that has been automatically collected via aircraft sensors and avionics, and/or user-entered, and transmitted to the server system for future use. The server system provides this obtained PIREP data to other aircraft traveling in an area for which the PIREP data is relevant, to provide weather data for use by the flight crew.

First, the process 800 establishes, by a server system, a communication connection with a computing device onboard a first aircraft (step 802). The communication connection is generally a wireless data communication connection using a data communication network such as that described previously with regard to FIG. 1. The process 800 then receives PIREP data, by the server system and via the communication connection (step 804). The PIREP data received by the process 800 is obtained by the first aircraft, using automatic PIREP data collection and automatic PIREP completion methods. The first aircraft generally collects the PIREP data while traveling in a particular geographic area, such as a geographic range surrounding a particular waypoint of a flight path. Once received, the server system stores the PIREP data for future use.

The process 800 then establishes, by the server system, a second communication connection with a second computing device onboard a second aircraft (step 806). The process 800 receives, by the server system, a request for a subset of the PIREP data via the second communication connection (step 808) and, in response, the process 800 then transmits, by the server system, the subset of the PIREP data via the second communication connection (step 810). In this way, the process 800 provides PIREP data collected by the first aircraft in a particular geographic area, to a second aircraft which may be traveling in the particular geographic area or planning to travel in the particular geographic area. Generally, the second aircraft requests and receives PIREPs associated with the needed geographic area during flight planning or other decision-making processes. In some cases, a plurality of aircraft may subscribe to, or otherwise establish communication connections to, the server system, such that the server system collects and stores automatically created PIREPs from the plurality of aircraft for associated geographic areas. In this example, the server system may provide the stored PIREPs to other subscribed aircraft, upon request.

The various tasks performed in connection with processes 600-800 may be performed by software, hardware, firmware, or any combination thereof. For illustrative purposes, the preceding descriptions of processes 600-800 may refer to elements mentioned above in connection with FIGS. 6-8. In practice, portions of processes 600-800 may be performed by different elements of the described system. It should be appreciated that processes 600-800 may include any number of additional or alternative tasks, the tasks shown in FIGS. 6-8 need not be performed in the illustrated order, and processes 600-800 may be incorporated into a more comprehensive procedure or process having additional functionality not described in detail herein. Moreover, one or more of the tasks shown in FIG. 6, 7, or 8 could be omitted from an embodiment of the process 600, 700, or 800, as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for obtaining, analyzing, and using pilot report (PIREP) data onboard an aircraft, the method comprising:
  detecting an altered environmental condition onboard the aircraft, by:
    detecting a current condition onboard the aircraft, via at least one of an aircraft onboard radar or aircraft onboard sensors, wherein the current condition comprises at least one of a weather condition, an altitude drop condition, or a navigation system outage condition;

comparing the current condition to a normal range of applicable conditions; and detecting a deviation by determining that the current condition deviates from the normal range of applicable conditions, based on the comparing;

in response to detecting the altered environmental condition, automatically identifying a PIREP associated with a current flight path of the aircraft, wherein the PIREP comprises an incomplete PIREP, by:

automatically detecting the PIREP based on a current geographic location of the aircraft;

detecting the PIREP based on user input selections; or automatically requesting the PIREP for the current geographic location in response to detecting the altered environmental condition;

wherein the PIREP comprises at least one of a geographic PIREP indicated by the current geographic location of the aircraft, a user-selected PIREP indicated by user input selections, and an altered condition PREP indicated by the altered environmental condition;

detecting information relevant to the PREP associated with the at least one waypoint of the current flight path of the aircraft, by at least one processor onboard the aircraft, by:

obtaining aircraft state data comprising at least the current geographic location and an aircraft type, via a communication device communicatively coupled to the at least one processor; and obtaining avionics data comprising at least one of flight plan data, radar data, aircraft sensor data, a current time, and a current altitude level, via the communication device, wherein the information relevant to the PIREP comprises at least the aircraft state data, the avionics data, and the deviation;

automatically completing the PREP using the information relevant to the PIREP, by the at least one processor, to generate a complete PREP; and presenting the complete PIREP via a display device onboard the aircraft, by:

presenting a set of color-coded markers via a graphical PIREP display, wherein the set of color-coded markers comprises user-selectable graphical elements, wherein each of the user-selectable graphical elements is associated with one individual PIREP, and wherein a criticality level of PIREP data is indicated by color-coding of each of the set of color-coded markers;

receiving a user input selection of one of the set of color-coded markers;

in response to the user input selection, presenting a PIREP graphical user interface (GUI) overlay to the graphical PIREP display, wherein the PIREP GUI overlay includes pre-completed PIREP data fields including data associated with the deviations;

receiving user input approval of the pre-completed PREP data fields including the data associated with the deviations; and in response to the user input approval, transmitting the complete PIREP to a remote server for storage and future use.

2. The method of claim 1, wherein the characteristic indicating a criticality level of each of the complete PIREPs and the pre-completed PIREPs comprises a color code mechanism.

3. The method of claim 1, further comprising:

detecting the current geographic location of the aircraft, via a navigation system communicatively coupled to the at least one processor; and automatically detecting the relevant PIREPs, based on the current geographic location;

wherein the complete PIREPs and the pre-completed PIREPs are presented in real-time, based on automatic detection.

4. The method of claim 1, further comprising:

receiving, via a user interface communicatively coupled to the at least one processor, user input location selections comprising at least a subset of a geographic area associated with the current flight plan; and automatically completing the set of incomplete PIREPs associated with the user input location selections using the aircraft data, to generate the complete PIREPs.

5. The method of claim 1, further comprising:

establishing, via the communication device, a communication connection to at least one remote server; and transmitting, via the communication device, the complete PIREPs and the pre-completed PIREPs to the at least one remote server.

6. The method of claim 5, further comprising transmitting the complete PIREPs in real-time, at a time of completion.

7. The method of claim 1, further comprising:

after automatic completion of the PREP, receiving user input PREP completion data for a second PIREP associated with the current geographic location of the flight path, via a user interface communicatively coupled to the at least one processor; and overwriting the automatic completion for one or more data fields of the second PIREP, based on the user input PIREP completion data, to generate a complete second PIREP.

8. A system for obtaining and using pilot report (PIREP) data, the system comprising:

system memory;

a communication device, configured to establish communication connections to one or more avionics devices onboard the aircraft, and to transmit and receive data via the communication connections, wherein the one or more avionics device comprises at least an aircraft onboard radar and aircraft onboard sensors;

a display device, configured to present the PIREP data; and at least one processor communicatively coupled to the system memory, the communication device, and the display device, the at least one processor configured to:

detect an altered environmental condition onboard the aircraft, by:

detecting a current condition onboard the aircraft, via at least one of the aircraft onboard radar or the aircraft onboard sensors, wherein the current condition comprises at least one of a weather condition, an altitude drop condition, or a navigation system outage condition;

comparing the current condition to a normal range of applicable conditions; and detecting a deviation by determining that the current condition deviates from the normal range of applicable conditions, based on the comparing;

in response to detecting the altered environmental condition, identify a PIREP associated with a current flight path of the aircraft, wherein the PIREP comprises an incomplete PIREP, by:
    automatically detecting the PIREP based on a current geographic location of the aircraft;
    detecting the PIREP based on user input selections; or
    automatically requesting the PIREP for the current geographic location in response to detecting the altered environmental condition;
    wherein the PIREP comprises at least one of a geographic PIREP indicated by the current geographic location of the aircraft, a user-selected PIREP indicated by user input selections, and an altered condition PIREP indicated by the altered environmental condition;
detect information relevant to the PIREP associated with the at least one waypoint, based on aircraft state data and avionics data obtained via the communication connections by:
    obtaining aircraft state data comprising at least the current geographic location and an aircraft type, via the communication device; and
    obtaining avionics data comprising at least one of flight plan data, radar data, aircraft sensor data, a current time, and a current altitude level, via the communication device, wherein the information relevant to the PIREP comprises at least the aircraft state data, the avionics data, and the deviation;
    automatically complete the PIREP associated with the current flight path using the information relevant to the PREP, to generate a complete PIREP; and
present the complete PIREPs via the display device, using a color code mechanism to indicate a criticality level of the PIREP data, by:
    presenting a set of color-coded markers on a graphical PIREP display, via the display device, wherein the set of color-coded markers comprises user-selectable graphical elements, wherein each of the user-selectable graphical elements is associated with one individual PREP, and wherein the criticality level of the PIREP data is indicated by color-coding of each of the set of color-coded markers;
    receiving a user input selection of one of the set of color-coded markers;
    in response to the user input selection, presenting a PIREP graphical user interface (GUI) overlay to the graphical PIREP display, via the display device, wherein the PIREP GUI overlay includes pre-completed PIREP data fields including data associated with the deviations;
    receiving user input approval of the pre-completed PIREP data fields including the data associated with the deviations; and
    in response to the user input approval, transmitting the complete PIREP to a remote server for storage and future use.

9. The system of claim 8, wherein the avionics device further comprise a navigation system communicatively coupled to the at least one processor, the navigation system configured to obtain the current geographical location of the aircraft; and
    wherein the at least one processor is further configured to:
        automatically detect relevant PIREPs, based on the current geographic location; and
        initiate presentation of pre-completed PIREPs in real-time, based on automatic detection.

10. The system of claim 8, further comprising a user interface communicatively coupled to the at least one processor, the user interface configured to receive user input location selections comprising at least a subset of a geographic area associated with the current flight plan;
    wherein the at least one processor is further configured to automatically complete the set of incomplete PIREPs associated with the user input location selections using the aircraft data, to generate the complete PIREPs.

11. The system of claim 8, wherein the communication device is further configured to establish a second communication connection to at least one remote server; and
    wherein the at least one processor is further configured to transmit, via the communication device, the complete PIREP to the at least one remote server.

12. A non-transitory, computer-readable medium containing instructions thereon, which, when executed by a processor, perform a method comprising:
    detecting an altered environmental condition onboard the aircraft, by:
        detecting a current condition onboard the aircraft, via at least one of an aircraft onboard radar or aircraft onboard sensors, wherein the current condition comprises at least one of a weather condition, an altitude drop condition, or a navigation system outage condition;
        comparing the current condition to a normal range of applicable conditions; and
        detecting a deviation by determining that the current condition deviates from the normal range of applicable conditions, based on the comparing;
    in response to detecting the altered environmental condition, automatically identifying, by the processor, a plurality of pilot reports (PIREPs) associated with a current flight plan of an aircraft, the plurality of PIREPs including an incomplete PIREP and pre-completed PIREPs, by:
        automatically detecting the plurality of PIREPs based on a current geographic location of the aircraft;
        detecting the plurality of PIREPs based on user input selections; or
        automatically requesting the plurality of PIREPs for the current geographic location in response to detecting the altered environmental condition;
        wherein the PIREP comprises at least one of a geographic PIREP indicated by the current geographic location of the aircraft, a user-selected PIREP indicated by user input selections, and an altered condition PREP indicated by the altered environmental condition;
    obtaining, by the processor, aircraft data from a plurality of avionics devices, the aircraft data associated with PIREP completion, by:
        obtaining aircraft state data comprising at least the current geographic location and an aircraft type, via a communication device communicatively coupled to the at least one processor; and
        obtaining avionics data comprising at least one of flight plan data, radar data, aircraft sensor data, a current time, and a current altitude level, via the communication device, wherein the aircraft data comprises information relevant to at least one of the plurality of PIREPs, and wherein the information relevant to the PIREP comprises at least the aircraft state data, the avionics data, and a deviation including the altered environmental condition;

in response to detecting the altered environmental condition, automatically completing the incomplete PIREP, by the processor, using the aircraft data to generate a complete PIREP; and presenting the complete PIREP and the pre-completed PIREPs, via a display device communicatively coupled to the processor, by:

presenting a set of color-coded markers via a graphical PIREP display, wherein the set of color-coded markers comprises user-selectable graphical elements, wherein each of the user-selectable graphical elements is associated with one individual PIREP, and wherein a criticality level of PIREP data is indicated by color-coding of each of the set of color-coded markers;

receiving a user input selection of one of the set of color-coded markers;

in response to the user input selection, presenting a PIREP graphical user interface (GUI) overlay to the graphical PIREP display, wherein the PIREP GUI overlay includes pre-completed PIREP data fields including data associated with the deviations;

receiving user input approval of the pre-completed PREP data fields including the data associated with the deviations; and in response to the user input approval, transmitting the complete PIREP to a remote server for storage and future use.

13. The non-transitory, computer-readable medium of claim 12, wherein the method further comprises:

receiving, via a user interface communicatively coupled to the processor, user input location selections comprising at least a subset of a geographic area associated with the current flight plan; and automatically completing the incomplete PIREP associated with the user input location selections using the aircraft data, to generate the complete PIREP.

14. The non-transitory, computer-readable medium of claim 12, wherein the method further comprises:

after automatic completion of the incomplete PIREP, receiving user input PIREP completion data for a second PIREP associated with the current geographic location of the flight path, via a user interface communicatively coupled to the processor; and overwriting automatic completion for one or more data fields of the second PIREP, based on the user input PIREP completion data, to generate a complete second PIREP, wherein the complete PIREPs comprise the complete second PIREP.

* * * * *